Aug. 10, 1954  A. LEFF  2,685,738
DENTAL TOOL
Filed Dec. 22, 1953  2 Sheets-Sheet 1

INVENTOR.
Alexander Leff
BY

ATTORNEY.

Aug. 10, 1954  A. LEFF  2,685,738
DENTAL TOOL
Filed Dec. 22, 1953  2 Sheets-Sheet 2

INVENTOR.
Alexander Leff
BY

ATTORNEY.

Patented Aug. 10, 1954

2,685,738

UNITED STATES PATENT OFFICE 2,685,738

DENTAL TOOL

Alexander Leff, Brooklyn, N. Y.

Application December 22, 1953, Serial No. 399,766

7 Claims. (Cl. 32—59)

This application is a continuation-in-part of my copending application Serial No. 335,077 filed February 4, 1953, now abandoned.

This invention relates to a tool and method for removing tooth enamel—and more particularly to the employment of rotary diamond wheel stones for the removal of sections of enamel in tooth preparation work.

According to conventional methods, diamond wheel stones are commonly employed for grinding away tooth enamel, such stones usually comprising a narrow cylindrical member with a flat peripheral edge and opposite substantially flat sides normal thereto, the stone being mounted on a mandrel for attachment to a source of rotary power. The said peripheral surface of the stone is covered with a layer of diamond granules, these occasionally extending slightly over the edges onto the peripheral portions of the sides. In the conventional process, the said stone is applied directly against the outer enamel surface, and pressure applied thereto, in a longitudinal direction, towards the pulp section of the tooth, in order to grind away the enamel by a direct abrading process. Inasmuch as the said pressure is exerted in the longitudinal direction of the rods of which the enamel structure is composed, the grinding process is exceedingly slow and tedious, because of the great compressive strength and abrading resistance of such rod structure. This results not only in the generation of heat within the tooth, to the discomforture of the patient, but also causes injury to the nerve of the tooth; and furthermore, the long grinding process results in the fatigue of the patient, as well as of the dentist. To reduce these ill effects, a dentist must proceed slowly and cautiously, with many interruptions as rest intervals, thereby consuming considerable valuable time in the process of preparing the tooth.

It is mainly within the contemplation of my invention to provide a novel tool and method that will improve upon conventional methods by facilitating the removal of enamel portions from a tooth, and accordingly considerably reduce the time required in preparation, obviate the danger of injuring the nerve, and relieve the patient of the pain and inconvenience to which he is generally subjected by conventional techniques.

In the accomplishment of the above-mentioned objectives, I employ a method whereby, during a considerable portion of the process, the direct longitudinal pressure conventionally applied to the tooth is reduced or eliminated, my invention providing for the undermining of the enamel rods by a lateral undercutting action. I have found that by this method the said enamel rods are deprived of their respective base supporting areas, and are thereby caused to flake off very rapidly, thus reducing the need to employ the pressures necessary with conventional methods, and consequently reducing the generation of heat in addition to the saving of time.

In the methods commonly employed in tooth preparation, it is generally required to use considerable manual effort in order to maintain the stone at a level for the desired depth of cut, a requirement which is frequently very tiring to the dentist. By the tool and method of my invention, I provide an inclined cutting surface during the lateral movement of the tool, the operative pressure during such movement at all times having a longitudinal or vertical component in the direction of the depth of cut, due to the said inclination of the cutting surface. In other words, there is always present a longitudinal resultant force which helps to maintain the tool in its proper position with respect to the depth of the cut, with considerably less effort than is necessary with conventional tools. This additionally reduces the heat generated in the grinding process.

In connection with the last-mentioned aspect of my invention, the inclined cutting or grinding surface of my novel tool is effective in creating a larger cutting area, per revolution of the stone, than is possible with the conventional stones in which the sides thereof are parallel to the longitudinal extent of the tooth—this greater surface further reducing the time of tooth preparation for equal depths of cut.

It is also within my contemplation to provide a simple and readily fabricated stone having the advantages aforesaid and being employable in the said process of my invention.

Other objects, features and advantages will appear from the drawings and the description hereinafter given.

Referring to the drawings.

Figure 6:
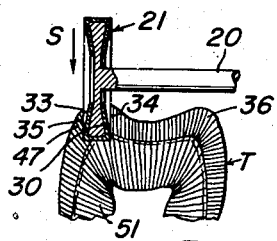
Figure 7:
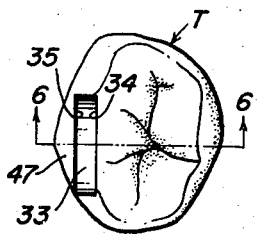

Figure 6 is a fragmentary longitudinal sectional view of a tooth in the process of preparation by a wheel stone of my invention, the stone being shown in a position at the completion of the initial longitudinal cut in accordance with the method of my invention, the section of the tooth being taken substantially along line 6—6 of Figure 7, the view being semi-diagrammatic in the representation of the enamel and dentin rod structure.

Figure 7 is a plan occlusal view of the tooth of Figure 6, showing the recess formed by the tool in the first step illustrated in Figure 6, the tool being removed in this view.

Figure 8:
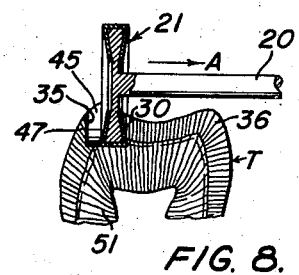
Figure 9:
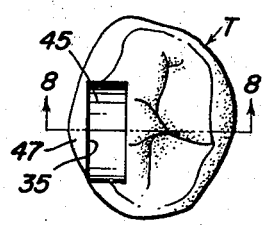

Figures 8 and 9 are views substantially similar to those of Figures 6 and 7, but showing the tool in an advanced position after the first step of the method.

Figure 10:
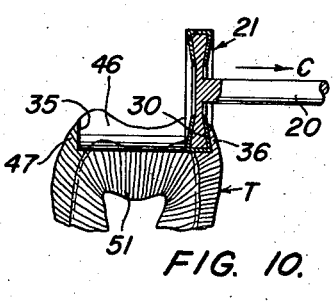
Figure 11:
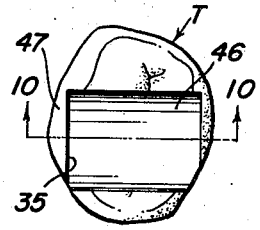

Figures 10 and 11 are views also substantially like those of Figures 6 and 7, the tool being shown approaching the end of its operative path across the tooth.

Figure 12:
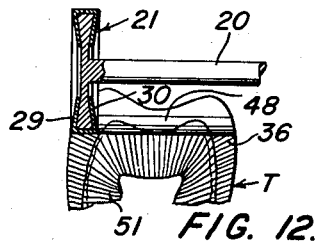

Figure 12 is a view substantially like Figure 10, but showing the recess completed at the right side of the tooth, and showing the tool retracted to a position adjacent the initial cut to complete the first transverse cut.

Figure 13:
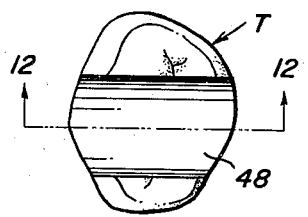

Figure 13 is a plan occlusal view of the tooth of Figure 12, with the tool removed, and showing the completed cut.

Figure 14:
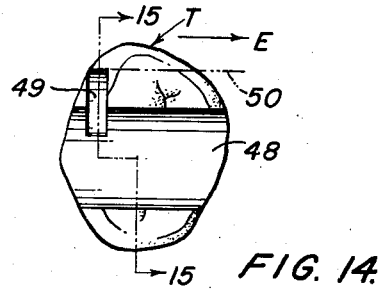

Figure 14 is a view substantially like Figure 13, but showing the beginning of a new cut adjacent the previously completed cut.

Figure 15:
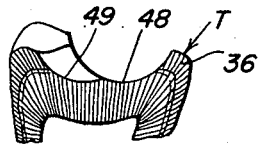

Figure 15 is a fragmentary sectional view of Figure 14, taken substantially along line 15—15 thereof.

Figure 16:
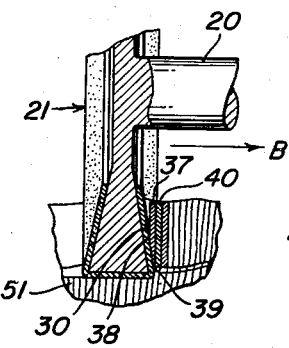

Figure 16 is an enlarged semi-diagrammatic vertical sectional view of a fragment of a tooth, showing the rods thereof, and illustrating the position of the stone of my invention when engaging one of the rods of the enamel structure during the tool's operative lateral movement.

Figure 17:
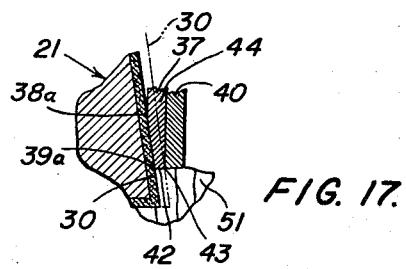

Figure 17 is a highly magnified diagrammatic representation of the view of Figure 16, showing adjacent fragments of enamel rods, and illustrating a fragment of the inclined grinding surface of the stone of my invention in undercutting engagement with a rod, the dot-dash line showing a further advanced position of said inclined grinding surface.

Figure 18:
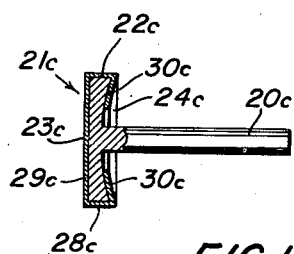

Figure 18 is a part side elevational view, part diametrical sectional view of a fourth form of dental wheel stone according to my invention.

Figure 19:
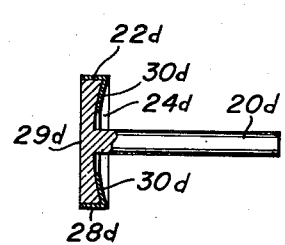

Figure 19 is a part side elevational view, part diametrical sectional view of a fifth form of dental wheel stone according to my invention.

Figure 20:
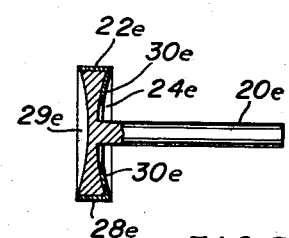

Figure 20 is a part side elevational view, part diametrical sectional view of a sixth form of dental wheel stone according to my invention.

Figure 2:
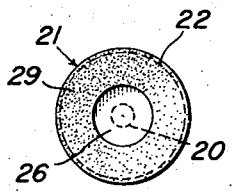
Figure 2 is a front view of Figure 1.
Figure 1:
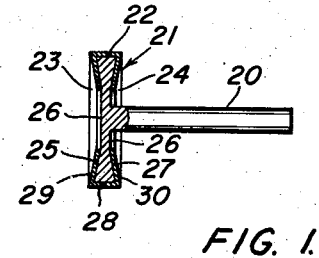
Figure 1 is a part side elevational view, part diametrical section of a dental wheel stone device according to one form of my invention.
Figure 3:
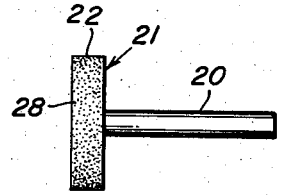
Figure 3 is a side elevational view of the device of Figure 1.

The form of my invention illustrated in Figures 1 to 3 comprises a mandrel 20 upon which is fixedly mounted the wheel stone 21 comprising a narrow peripheral surface 22 and two opposite depressed sides 23 and 24, each of said sides having a conical portion tapering inwardly from the periphery of the stone to a central portion normal to the axis of the mandrel. More specifically, the side 23 comprises the inwardly tapering conical wall portion 25 joining the flat central wall 26 normal to the axis of the wheel; and the said side 24 comprises the inwardly tapering conical wall 27 joining the flat central wall 26 normal to the axis of the mandrel. The structure accordingly presents a wheel stone the opposite faces of which are hollowed-out, thereby providing operative surfaces 25 and 27 which are inclined to the axis of the mandrel. A layer of diamond granules is adhesively secured both to the peripheral surface 22 and the said inclined side walls 25 and 27, the portion of said layer covering the peripheral wall being identified by the reference numeral 28, and the portions covering the inclined walls 25 and 27 being identified by the reference numerals 29 and 30, respectively.

Figure 4:
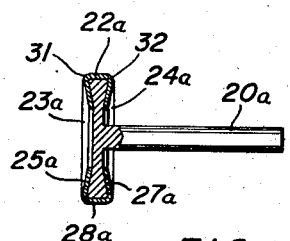
Figure 4 is a part side elevational, part sectional view of another form of dental wheel stone according to my invention.
Figure 5:
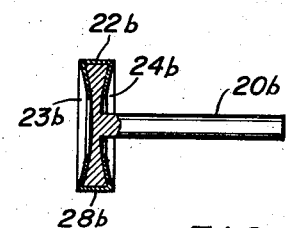
Figure 5 is a part side elevational, part sectional view of still another form of wheel stone according to my invention.

In the form of my invention illustrated in Figure 4, the structure is substantially similar to that of Figure 1, there being a substantially cylindrical peripheral operative surface 22a and opposite substantially concave side walls 23a and 24a, these having the inclined operative surfaces 25a and 27a, respectively, the said operative surfaces being covered by the abrasive coating designated generally 28a. This form is distinguished from that of Figure 1 by virtue of the fact that the opposite circumferential corner portions 31 and 32 are rounded, rather than sharp as in the form of Figure 1. The modification illustrated in Figure 5 is substantially similar to the forms of Figures 1 and 4, except that the hollowed-out walls 23b and 24b are concavely curved substantially throughout their entire extent, such concave surfaces meeting the peripheral surface 22b substantially in the manner indicated in Figure 1. The devices of Figures 4 and 5 have mandrels 20a and 20b, respectively, like mandrel 20 of the form first above described, for attachment to a source of rotary power.

The modification illustrated in Figure 18 comprises a mandrel 20c upon which is fixedly mounted a disc-like wheel stone 21c including a narrow substantially cylindrical peripheral wall 22c, a planar or flat side wall 23c and an opposite hollowed-out side wall 24c, the mandrel being secured centrally to the hollowed-out side wall 24c with its axis normal to the planar side wall 23c. Although the side wall 24c is shown as concavely curved throughout its length it will be understood that it can take the shape of either side wall 23, 24 shown in Figure 1 or side wall 23a, 24a shown in Figure 4.

A layer of diamond granules or equivalent abrasive 28c is adhesively secured to the peripheral wall 22c, another layer of abrasive granules 29c is adhesively secured to the planar side wall 23c, and a further layer of abrasive granules 30c is adhesively secured to the hollowed-out side wall 24c, the latter extending preferably from the peripheral wall to an area spaced from the mandrel. Thus in this form of the invention the wheel includes an operative surface 28c parallel to the mandrel axis, an operative surface 29c normal to the mandrel axis and operative surfaces 30c inclined to the mandrel axis.

The modification illustrated in Figure 19 is substantially the same as that of Figure 18 except that the planar or flat side wall 29d is not coated with abrasive granules. Abrasive granules are coated only on the peripheral wall 22d as at 28d and on the hollowed-out side wall 24d as at 30d. Thus in this form of the invention the wheel includes an operative surface 28d parallel to the axis of the mandrel 20d and operative surfaces 30d inclined to the axis of the mandrel on one side wall only of the wheel.

The modification illustrated in Figure 20 is similar to that of Figure 19 except that the side wall 29e is hollowed-out as is the opposing side wall 24e. The side wall 29e is not coated with abrasive granules. Abrasive granules are coated only on the peripheral wall 22e as at 28e and on the hollowed-out side wall 24e as at 30e, the said side wall 24e being the one to which the mandrel 20e is secured. Thus in this form of the invention, as in the one shown in Figure 19, the wheel includes an operative surface 28e parallel to the mandrel axis and operative surfaces 30e inclined to the mandrel axis on one side wall only of the wheel.

In employing the wheel stone of my invention, such as the stone 21, to my method of removing enamel, the first step is to apply said stone to the outer enamel surface of the tooth T, preferably in a marginal region such as is indicated in Figure 6, applying pressure towards the tooth's pulp portion to produce the initial or starting cut, the starting cut in this figure being in the direction of arrow S. This produces a recess 33 having opposite flat parallel walls 34 and 35. Thereafter the tool is moved in a lateral direction, the inclined abrasive walls thereof engaging the enamel structure and causing, by an undercutting action, an undermining of the said rods of which the enamel is composed. Such rods are diagrammatically illustrated, and are identified in Figures 6, 8, 10 and 12 by the reference numeral 36. When, for example, the inclined wall 30 of the stone 21 comes into engagement with said rods 36 during an operative movement of the stone 21 in the direction of arrow A (Fig. 8), the lower or base portions of each of the rods will be ground away before the upper portion thereof, thereby causing a flaking off of each of the rods during the advancing lateral movement of the stone.

This action is clearly illustrated in Figures 16 and 17. It will be noted, in Figure 16, that the inclined grinding surface 30 engages the enamel rod 37 along a portion thereof beginning at point 38 and ending at point 39 at the base of the rod. As the tool advances in the direction of arrow B, the entire base portion of the enamel rod 37 is completely ground away, causing it to flake off. This process continues as the grinding surface 30 meets successively adjacent rods.

The action is more clearly illustrated in Figure 17, in which the enamel rods 37 and 40 are shown greatly magnified, the surface 30 of the stone being shown inclined to the longitudinal direction of the rods, and in engagement with rod 37 at the lower portion thereof between points 38a and 39a. At this position of the tool 21, the rod 37 is supported only at its base along line 42 extending between points 39a and 43. As the tool 21 advances towards the dot-dash line position, with surface 30 intersecting point 43, the entire base portion, which was previously secured to the dentin structure 51, will have been removed. Accordingly, the section of the rod above the dot-dash line, that is, the section 44, will no longer have any supporting base, and will accordingly flake off as the tool advances towards the right.

This action continues along the entire lateral path of the stone, causing all the rods to flake off with a minimum of effort, since no downward pressure is required as is necessary with conventional methods, as aforesaid. It is further to be noted that in view of the fact that the surface 30 of the cutting stone is at an inclination to the longitudinal extent of the rod, a greater cutting or abrading surface is presented than would be possible with a cutting surface which extends in a direction longitudinally with respect to the rod. Furthermore, since the surface 30 meets the enamel rods at an inclination, there is a longitudinal component of the applied pressure which helps in keeping the tool in its proper cutting position.

This process is continued after the initial cut of Figure 6, as aforesaid, to produce an enlarged cut 45 (see Figs. 8 and 9); and as the tool is moved towards the right in the direction of arrow C (Fig. 10), the lateral cut 46 extends almost to the edge of the tooth. The cut is then completed, by further continuing in the direction of arrow C, and then the tool is brought back to the position shown in Fig. 12 to remove wall 47 (Fig. 6), and thereby complete the cut or channel 48, as shown in Figure 13.

The above-described process may be carried out with all modifications of the tool shown and described herein. When the tool shown in Figure 18 is used, it is the planar operative surface 29c which removes the wall 47 to complete the cut or channel 48 when the tool is brought back to the position shown in Figure 12. When using either of the tools shown in Figures 19 and 20, the wall 47 is removed by turning the tool around and moving it in a direction opposite to arrow C of Figure 10. In so doing, it is the inclined operative surface 30d or 30e which abrades the wall 47.

Selected surfaces of the tooth can be prepared by a repetition of the process, the tool being applied to the next adjacent portion of cut 48 (see Fig. 14), to produce the cut 49 analogous to initial cut 33; and the tool is then moved in the direction of arrow E to produce another complete cut extending above dot-dash line 50. In this manner any selected portion of the enamel can be removed, with a minimum of effort, and without the dangerous generation of heat that accompanies the conventional grinding processes. It has been my experience that in cases where fifteen or twenty minutes would be required in a preparation by conventional grinding methods, I have been able to reduce the preparation time by as much as four-fifths.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a dental tool for the removal of an enamel section of a tooth, a disc-like wheel stone having a circumferential peripheral wall and two opposite depressed sides; said sides comprising central portions disposed inwardly from the respective planes of the outer edges of said peripheral wall, and generally inwardly sloping marginal portions extending from the respective outer edges of said peripheral wall to said central portions, the said peripheral wall and said marginal portions of both of said sides being coated with a granular abrasive material.

2. In a dental tool for the removal of an enamel section of a tooth, a disc-like wheel stone having a substantially cylindrical circumferential peripheral wall and two opposite depressed sides; said sides comprising central portions disposed inwardly from the respective planes of the outer edges of said peripheral wall, and extended marginal substantially conical portions tapering inwardly from the respective outer edges of said peripheral wall to said central portions, said peripheral wall and said extended marginal portions of both of said sides being coated with a granular abrasive material.

3. In a dental tool for the removal of an enamel section of a tooth, a disc-like wheel stone having a circumferential peripheral wall and two opposite side walls, one of which side walls is depressed and the other substantially planar; said depressed side wall comprising a central portion disposed inwardly from the plane of the adjacent outer edge of said peripheral wall, and a generally inwardly sloping marginal portion extending from said adjacent outer edge of said peripheral wall to said central portion, said planar side wall, said peripheral wall and said marginal portion all being coated with a granular abrasive material.

4. In a dental tool for the removal of an enamel section of a tooth, a disc-like wheel stone having a circumferential peripheral wall and two opposite depressed sides; said sides comprising central portions disposed inwardly from the respective planes of the outer edges of said peripheral wall, and generally inwardly sloping marginal portions extending from the respective outer edges of said peripheral wall to said central portions, the said peripheral wall and said marginal portions of both of said sides being coated with a granular abrasive material, and a mandrel attached to the central portion of one of said depressed sides.

5. In a dental tool for the removal of an enamel section of a tooth, a disc-like wheel stone having a substantially cylindrical circumferential peripehral wall and two opposite depressed sides; said sides comprising central portions disposed inwardly from the respective planes of the outer edges of said peripheral wall, and extended marginal substantially conical portions tapering inwardly from the respective outer edges of said peripheral wall to said central portions, said peripheral wall and said extended marginal portions of both of said sides being coated with a granular abrasive material, and a mandrel attached to the central portion of one of said depressed sides.

6. In a dental tool for the removal of an enamel section of a tooth, a disc-like wheel stone having a circumferential peripheral wall and two opposite side walls, at least one of which side walls is depressed; said depressed side wall comprising a central portion disposed inwardly from the plane of the adjacent outer edge of said peripheral wall, and a generally inwardly sloping marginal portion extending from said adjacent outer edge of said peripheral wall to said central portion, said peripheral wall and said marginal portion being coated with a granular abrasive material, and a mandrel attached to the central portion of said depressed side wall and extending between and beyond said adjacent outer edge of said peripheral wall.

7. In a dental tool for the removal of an enamel section of a tooth, a disc-like wheel stone having a circumferential peripheral wall and two opposite side walls, one of which side walls is depressed and the other substantially planar; said depressed side wall comprising a central portion disposed inwardly from the plane of the adjacent outer edge of said peripheral wall, and a generally inwardly sloping marginal portion extending from said adjacent outer edge of said peripheral wall to said central portion, said planar side wall, said peripheral wall and said marginal portion all being coated with a granular abrasive material, and a mandrel attached to the central portion of said depressed side wall and extending between and beyond said adjacent outer edge of said peripheral wall.

References Cited in the file of this patent

UNITED STATES PATENTS

| Number | Name | Date |
|---|---|---|
| 1,106,894 | Samphere | Aug. 11, 1914 |
| 1,294,423 | Davis | Feb. 18, 1919 |
| 1,646,330 | Taylor | Oct. 18, 1927 |